(12) United States Patent
Du et al.

(10) Patent No.: US 10,083,664 B1
(45) Date of Patent: *Sep. 25, 2018

(54) THIN FILM TRANSISTOR ARRAY SUBSTRATE AND DISPLAY PANEL

(71) Applicant: Shenzhen China Star Optoelectronics Technology Co., Ltd., Shenzhen, Guangdong (CN)

(72) Inventors: Peng Du, Guangdong (CN);
Ming-Hung Shih, Guangdong (CN);
Chih-Tsung Kang, Guangdong (CN);
Je-Hao Hsu, Guangdong (CN); Qibiao Lv, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/971,219

(22) Filed: May 4, 2018

Related U.S. Application Data (62) Division of application No. 14/436,056, filed on Apr. 15, 2015.

(51) Int. Cl.
*G09G 3/36* (2006.01)
*G02F 1/1343* (2006.01)
(Continued)

(52) U.S. Cl.
CPC ......... *G09G 3/3607* (2013.01); *G02F 1/1368* (2013.01); *G02F 1/134309* (2013.01);
(Continued)

(58) Field of Classification Search
CPC combination set(s) only.
See application file for complete search history.

(56) References Cited

U.S. PATENT DOCUMENTS

| 6,456,351 B1 | 9/2002 | Kim et al. |
| 2001/0019383 A1* | 9/2001 | Shin .................. G02F 1/133514 349/106 |

(Continued)

FOREIGN PATENT DOCUMENTS

| CN | 1821842 A | 8/2006 |
| CN | 101109875 A | 1/2008 |

(Continued)

*Primary Examiner* — Jennifer Mehmood
*Assistant Examiner* — Deeprose Subedi
(74) *Attorney, Agent, or Firm* — Andrew C. Cheng (57) ABSTRACT

A thin film transistor (TFT) array substrate and a display panel are provided. The TFT array substrate includes multiple pixels arranged in an array. Each pixel includes first through third sub-pixels sequentially arranged along a first direction. The first through third sub-pixels are connected to a same scan line. The TFT array substrate further includes first through third data lines sequentially arranged along the first direction. The first through third data lines respectively are for driving the first through third sub-pixels. The first sub-pixel includes first and second areas, the second sub-pixel includes third and fourth areas, and the third sub-pixel includes fifth and sixth areas, arranged along a second direction. A voltage difference between a sub-pixel electrode in the sixth area and a common electrode is different from a voltage difference between a sub-pixel electrode in the fifth area and the common electrode.

10 Claims, 8 Drawing Sheets

(51) Int. Cl.
    *G02F 1/1362*     (2006.01)
    *G02F 1/1368*     (2006.01)

(52) U.S. Cl.
    CPC ..... *G02F 1/136286* (2013.01); *G09G 3/3655* (2013.01); *G09G 3/3688* (2013.01); *G02F 1/13624* (2013.01); *G02F 2001/134345* (2013.01); *G02F 2201/121* (2013.01); *G09G 2300/0426* (2013.01); *G09G 2300/0447* (2013.01)

(56) References Cited

U.S. PATENT DOCUMENTS

| | | | |
|---|---|---|---|
| 2008/0158464 A1 | 7/2008 | Chang et al. | |
| 2012/0026444 A1* | 2/2012 | Xi | G02F 1/136213 349/139 |
| 2012/0281168 A1 | 11/2012 | Shimoshikiryoh | |

FOREIGN PATENT DOCUMENTS

| | | |
|---|---|---|
| CN | 101308297 A | 11/2008 |
| CN | 101315504 A | 12/2008 |
| CN | 102460556 A | 5/2012 |
| CN | 102540604 A | 7/2012 |
| CN | 103513481 A | 1/2014 |
| CN | 103676389 A | 3/2014 |
| KR | 20120060690 A | 6/2012 |

\* cited by examiner

THIN FILM TRANSISTOR ARRAY SUBSTRATE AND DISPLAY PANEL

CROSS REFERENCE TO RELATED APPLICATIONS

This is a continuation application of co-pending U.S. patent application Ser. No. 14/436,056, filed on Apr. 15, 2015, which is a national stage of PCT Application No. PCT/CN2015/071176, filed on Jan. 21, 2015, claiming foreign priority of Chinese Patent Application No. 201410854643.2, filed on Dec. 31, 2014.

BACKGROUND OF THE INVENTION

1. Field of the Invention

The invention relates to the field of display technology, and particularly to a thin film transistor array substrate and a display panel.

2. Description of Related Art

The liquid crystal display (LCD) is a commonly used electronic device, and because of its low power consumption, small size, light weight and other characteristics, it is quite popular for users. Current liquid crystal displays mainly are thin film transistor (TFT) liquid crystal displays. With the development of flat panel display technology, the demand for liquid crystal display with wide viewing angle has been proposed. However, the conventional wide viewing angle liquid crystal display panel usually produces the color shift problem when being observed in large viewing angle. Therefore, in the prior art, the liquid crystal display panel when being observed in large viewing angle would produce technical problems such as color shift.

SUMMARY OF THE INVENTION

The invention provides a thin film transistor array substrate. The thin film transistor array substrate is disposed with a plurality of pixels arranged in an array. Each of the plurality of pixels includes a first sub-pixel, a second sub-pixel and a third sub-pixel sequentially arranged along a first direction, the first sub-pixel, the second sub-pixel and the third sub-pixel are connected to a same scan line. The thin film transistor array substrate further is disposed with a first data line, a second data line and a third data line sequentially arranged along the first direction, the first data line is configured for driving the first sub-pixel, the second data line is configured for driving the second sub-pixel, the third data line is configured for driving the third sub-pixel. The first sub-pixel includes a first area and a second area arranged along a second direction. The second sub-pixel includes a third area and a fourth area arranged along the second direction. The third sub-pixel includes a fifth area and a sixth area arranged along the second direction. A voltage difference between a sub-pixel electrode in the sixth area and a common electrode is different from a voltage difference between a sub-pixel electrode in the fifth area and the common electrode.

In an embodiment, the first area has a first thin film transistor disposed therein, the second area has a second thin film transistor disposed therein, the third area has a third thin film transistor disposed therein, the fourth area has a fourth thin film transistor disposed therein, the fifth area has a fifth thin film transistor disposed therein, the sixth area has a sixth thin film transistor and a seventh thin film transistor disposed therein; gates of the first thin film transistor, the second thin film transistor, the third thin film transistor, the fourth thin film transistor, the fifth thin film transistor, the sixth thin film transistor and the seventh thin film transistor are connected to the same scan line, drains of the first thin film transistor and the second thin film transistor are connected to the first data line, a source of the first thin film transistor sequentially connects a first main sub-pixel electrode and a first capacitor to the common electrode, a source of the second thin film transistor sequentially connects a first subsidiary sub-pixel electrode and a second capacitor to the common electrode, drains of the third thin film transistor and fourth thin film transistor are connected to the second data line, a source of the third thin film transistor sequentially connects a second main sub-pixel electrode and a third capacitor to the common electrode, a source of the fourth thin film transistor sequentially connects a second subsidiary sub-pixel electrode and a fourth capacitor to the common electrode, drains of the fifth thin film transistor and the sixth thin film transistor are connected to the third data line, a source of the fifth thin film transistor sequentially connects a third main sub-pixel electrode and a fifth capacitor to the common electrode, a source of the sixth thin film transistor sequentially connects a third subsidiary sub-pixel electrode and a sixth capacitor to the common electrode, a drain of the seventh thin film transistor is connected to the third subsidiary sub-pixel electrode, and a source of the seventh thin film transistor is connected to the common electrode.

In an embodiment, a voltage difference between a sub-pixel electrode in the fourth area and the common electrode is different from a voltage difference between a sub-pixel electrode in the third area and the common electrode.

In an embodiment, the four area has an eighth thin film transistor disposed therein, a gate of the eighth thin film transistor is connected to the scan line, a drain of the eighth thin film transistor is connected to a second subsidiary sub-pixel electrode, and a source of the eighth thin film transistor is connected to the common electrode.

In an embodiment, the thin film transistor array substrate further is disposed with a fourth data line, the third data line is configured for driving the fifth area of the third sub-pixel, the fourth data line is configured for the sixth area of the third sub-pixel, a driving voltage applied onto the third data line is different from a driving voltage applied onto the fourth data line.

In an embodiment, the first area has a first thin film transistor disposed therein, the second area has a second thin film transistor disposed therein, the third area has a third thin film transistor disposed therein, the fourth area has a fourth thin film transistor disposed therein, the fifth area has a fifth thin film transistor disposed therein, and the sixth area has a sixth thin film transistor disposed therein; gates of the first thin film transistor, the second thin film transistor, the third thin film transistor, the fourth thin film transistor, the fifth thin film transistor and the sixth thin film transistor are connected to the same scan line, drains of the first thin film transistor and the second thin film transistor are connected to the first data line, a source of the first thin film transistor sequentially connects a first main sub-pixel electrode and a first capacitor to the common electrode, a source of the second thin film transistor sequentially connects a first subsidiary sub-pixel electrode and a second capacitor to the common electrode; drains of the third thin film transistor and the fourth thin film transistor are connected to the second data line, a source of the third thin film transistor sequentially connects a second main sub-pixel electrode and a third capacitor to the common electrode, a source of the fourth thin film transistor sequentially connects a second subsidiary sub-pixel electrode and a fourth capacitor to the common electrode; a drain of the fifth thin film transistor is connected to the third data line, a source of the fifth thin film transistor sequentially connects a third main sub-pixel electrode and a fifth capacitor to the common electrode, a drain of the sixth thin film transistor is connected to the fourth data line, a source of the sixth thin film transistor sequentially connects a third subsidiary sub-pixel electrode and a sixth capacitor to the common electrode.

In an embodiment, the thin film transistor array substrate further is disposed with a fifth data line, the second data line is configured for driving the third area of the second sub-pixel, the fifth data line is configured for driving the fourth area of the second sub-pixel, a driving voltage applied onto the second data line is different from a driving voltage applied onto the fifth data line.

In an embodiment, the first area has a first thin film transistor disposed therein, the second area has a second thin film transistor disposed therein, the third area has a third thin film transistor disposed therein, the fourth area has a fourth thin film transistor disposed therein, the fifth area has a fifth thin film transistor disposed therein, and the sixth area has a sixth thin film transistor disposed therein; gates of the first thin film transistor, the second thin film transistor, the third thin film transistor, the fourth thin film transistor, the fifth thin film transistor and the sixth thin film transistor are connected to the same scan line, drains of the first thin film transistor and the second thin film transistor are connected to the first data line, a source of the first thin film transistor sequentially connects a first main sub-pixel electrode and a first capacitor to the common electrode, a source of the second thin film transistor sequentially connects a first subsidiary sub-pixel electrode and a second capacitor to the common electrode; a source of the third thin film transistor sequentially connects a second main sub-pixel electrode and a third capacitor to the common electrode, a drain of the third thin film transistor is connected to the second data line, a source of the fourth thin film transistor sequentially connects a second subsidiary sub-pixel electrode and a fourth capacitor to the common electrode, a drain of the fourth thin film transistor is connected to the fifth data line; a drain of the fifth thin film transistor is connected to the third data line, a source of the fifth thin film transistor sequentially connects a third main sub-pixel electrode and a fifth capacitor to the common electrode, a drain of the sixth thin film transistor is connected to the fourth data line, and a source of the sixth thin film transistor sequentially connects a third subsidiary sub-pixel electrode and a sixth capacitor to the common electrode.

In an embodiment, the first sub-pixel is a red sub-pixel, the second sub-pixel is a green sub-pixel, and the third sub-pixel is a blue sub-pixel.

The invention further provides a display panel. The display panel includes any one of the thin film transistor array substrates associated with the above various embodiments.

BRIEF DESCRIPTION OF THE DRAWINGS

In order to more clearly illustrate the technical solutions of embodiments of the invention or the prior art, drawings will be used in the description of the embodiments of the invention or the prior art will be given a brief description below. Apparently, the drawings in the following description only are some of embodiments of the invention, the ordinary skill in the art can obtain other drawings according to these illustrated drawings without creative effort.

DETAILED DESCRIPTION OF THE PREFERRED EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Figure 1:
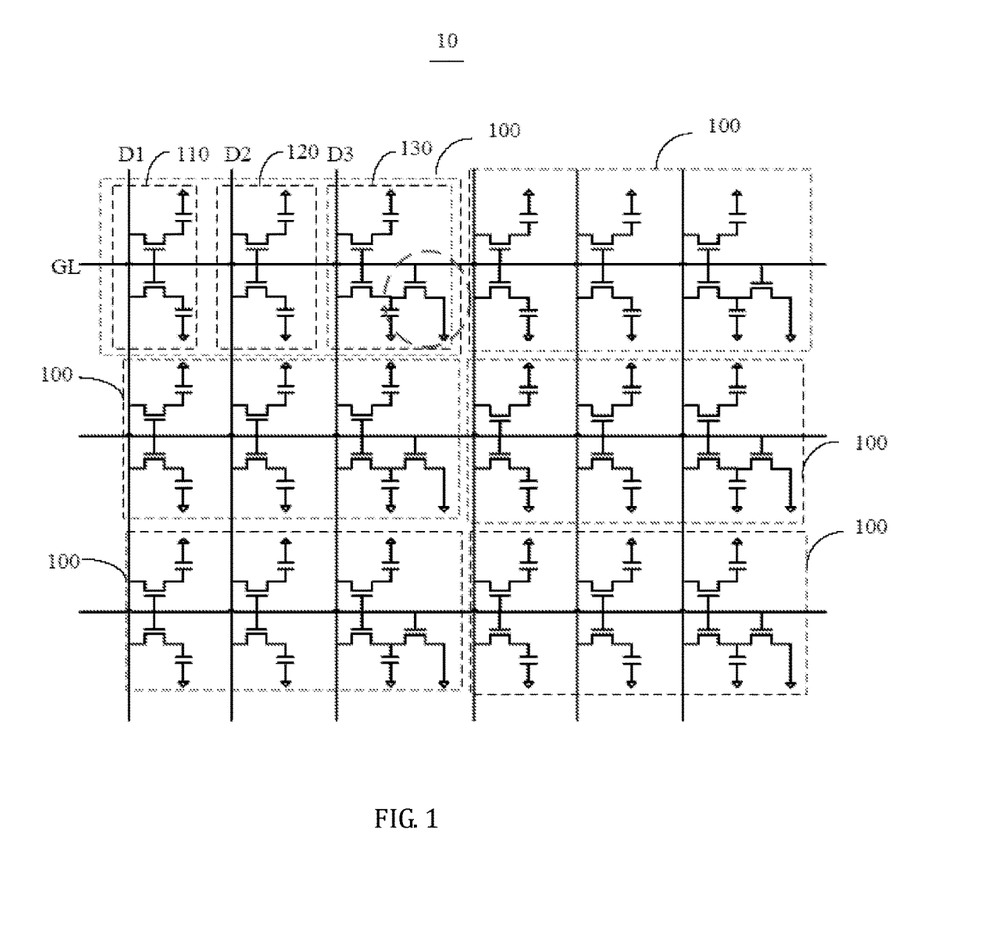
FIG. 1 is a schematic view of a thin film transistor array substrate according to a first preferred embodiment of the invention.
Figure 2:
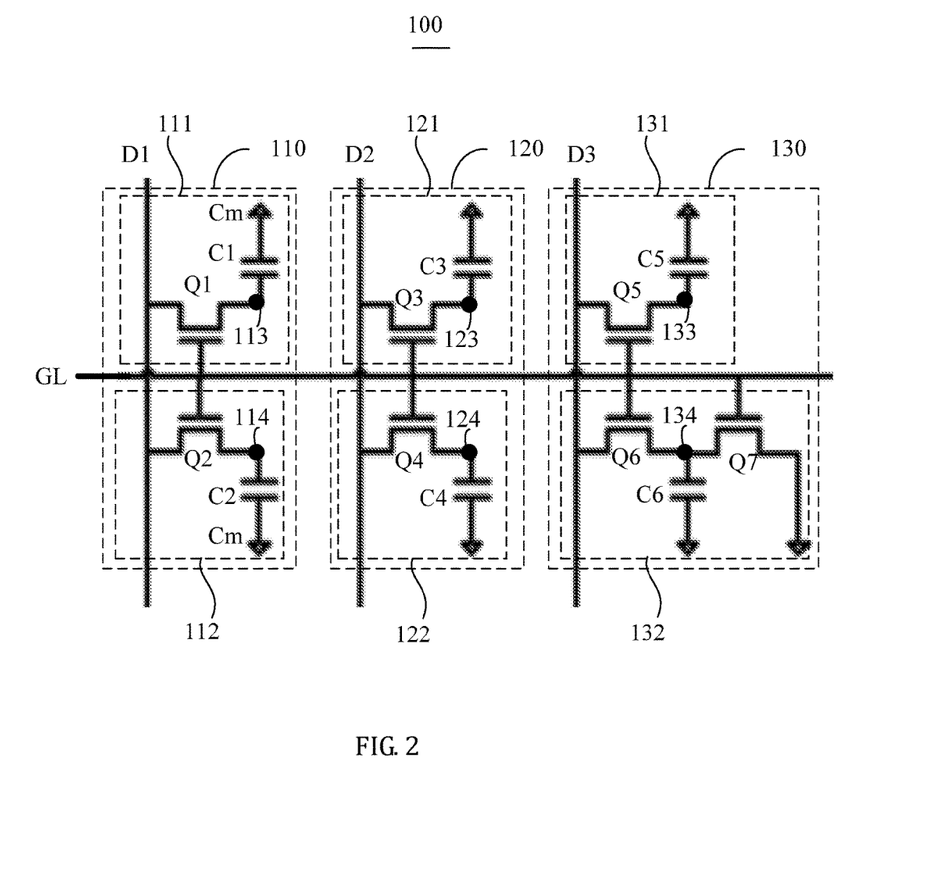
FIG. 2 is a structural schematic view of a pixel in the thin film transistor array substrate according to the first preferred embodiment of the invention.

Please refer to FIG. 1 and FIG. 2, FIG. 1 is a schematic view of a thin film transistor array substrate according to a first preferred embodiment of the invention, and FIG. 2 is a structural schematic view of a pixel in the thin film transistor array substrate according to the first preferred embodiment of the invention. The thin film transistor array substrate 10 is disposed with a plurality of pixels 100 arranged in an array. Each pixel 100 includes a first sub-pixel 110, a second sub-pixel 120 and a third sub-pixel 130 arranged along a first direction. The first sub-pixel 110, the second sub-pixel 120 and the third sub-pixel 130 are connected to a same scan line GL. The thin film transistor array substrate 10 further is disposed with a first data line D1, a second data line D2 and a third data line D3 sequentially arranged along the first direction. The first data line D1 is configured (i.e., structured and arranged) for driving the first sub-pixel 110, the second data line D2 is configured for driving the second sub-pixel 120, and the third data line D3 is configured for driving the third sub-pixel 130. The first sub-pixel 110 includes a first area 111 and a second area 112 arranged along a second direction, the second sub-pixel 120 includes a third area 121 and a fourth area 122 arranged along the second direction, the third sub-pixel 130 includes a fifth area 131 and a sixth area 132 arranged along the second direction. A voltage difference between a sub-pixel electrode in the sixth area 132 and a common electrode is different from a voltage difference between a sub-pixel electrode in the fifth area 131 and the common electrode. In this embodiment, the first direction is the horizontal direction, and the second direction is the vertical direction.

The first area 111 has a first thin film transistor Q1 disposed therein, the second area 112 has a second thin film transistor Q2 disposed therein, the third area 121 has a third thin film transistor Q3 disposed therein, the fourth area 122 has a fourth thin film transistor Q4 disposed therein, the fifth area 131 has a fifth thin film transistor Q5 disposed therein, the sixth area 132 has a sixth thin film transistor Q6 and a seventh thin film transistor Q7 disposed therein. The first thin film transistor Q1, the second thin film transistor Q2, the third thin film transistor Q3, the fourth thin film transistor Q4, the fifth thin film transistor Q5, the sixth thin film transistor Q6 and the seventh thin film transistor Q7 each include a gate, a source and a drain. The first area 111, the second area 112, the third area 121, the fourth area 122, the fifth area 131 and the sixth area 132 each are corresponding to one sub-pixel electrode disposed therein. For the convenience of description, the corresponding sub-pixel electrode in the first area 111 is named as first main sub-pixel electrode 113, the corresponding sub-pixel electrode in the second area 112 is named as first subsidiary sub-pixel electrode 114, the corresponding sub-pixel electrode in the third area 121 is named as second main sub-pixel electrode 123, the corresponding sub-pixel electrode in the fourth area 122 is named as second subsidiary sub-pixel electrode 124, the corresponding sub-pixel electrode in the fifth area 131 is named as third main sub-pixel electrode 133, and the corresponding sub-pixel electrode in the sixth area 132 is named as third subsidiary sub-pixel electrode 134. It should be understood to those skilled in the art that, the names of the corresponding sub-pixel electrodes of the above various areas only are to distinguish the sub-pixels in different areas and for the convenience of description, and thus actually have no distinction of main and subsidiary.

The gates of the first thin film transistor Q1, the second thin film transistor Q2, the third thin film transistor Q3, the fourth thin film transistor Q4, the fifth thin film transistor Q5, the sixth thin film transistor Q6 and the seventh thin film transistor Q7 are connected to the same scan line GL. The drains of the first thin film transistor Q1 and the second thin film transistor Q2 are connected to the first data line D1, the source of the first thin film transistor Q1 sequentially connects the first main sub-pixel electrode 113 and a first capacitor C1 to a common electrode Cm (denoted by the triangle Δ in FIG. 2), the source of the second thin film transistor Q2 sequentially connects the first subsidiary sub-pixel electrode 114 and a second capacitor C2 to the common electrode Cm. The drains of the third thin film transistor Q3 and the fourth thin film transistor Q4 are connected to the second data line D2, the source of the third thin film transistor Q3 sequentially connects the second main sub-pixel electrode 123 and a third capacitor C3 to the common electrode Cm, and the source of the fourth thin film transistor Q4 sequentially connects the second subsidiary sub-pixel electrode 124 and a fourth capacitor C4 to the common electrode Cm. The drains of the fifth thin film transistor Q5 and the sixth thin film transistor Q6 are connected to the third data line D3, the source of the fifth thin film transistor Q5 sequentially connects the third main sub-pixel electrodes 133 and a fifth capacitor C5 to the common electrode Cm, and the source of the sixth thin film transistor Q6 sequentially connects the third subsidiary sub-pixel electrode 134 and a sixth capacitor C6 to the common electrode Cm. The drain of the seventh thin film transistor Q7 is connected to the third subsidiary sub-pixel electrode 134, and the source of the seventh thin film transistor Q7 is connected to the common electrode Cm.

In this embodiment, since the fifth thin film transistor Q5 of the fifth area 131 and sixth thin film transistor Q6 of the sixth area 132 both are connected to the third data line D3, the source of the fifth thin film transistor Q5 sequentially connects the third main sub-pixel electrode 133 and the fifth capacitor C5 to the common electrode Cm, the source of the sixth thin film transistor Q6 sequentially connects the third subsidiary sub-pixel electrode 134 and the sixth capacitor C6 to the common electrode Cm, the drain of the seventh thin film transistor Q7 is connected to the third subsidiary sub-pixel electrode 134, and the source of the seventh thin film transistor Q7 is connected to the common electrode Cm. That is, because the thin film transistor has a certain resistance, by the voltage-dividing effect of the seventh thin film transistor Q7, a voltage applied onto the third subsidiary sub-pixel electrode 134 in the sixth area 132 is different from a voltage applied onto the third main sub-pixel electrode 133 in the fifth area 131. In this embodiment, the voltage applied onto the third subsidiary sub-pixel electrode 134 in the sixth area 132 is smaller than the voltage applied onto the third main sub-pixel electrode 133 in the fifth area 131.

In this embodiment, a voltage difference between the sub-pixel electrode of the sixth area 132 and the common electrode is different from a voltage difference between the sub-pixel electrode of the fifth area 131 and the common electrode, and therefore, the voltage applied onto the sub-pixel electrode of the sixth area 132 is different from the voltage applied onto the sub-pixel electrode of the fifth area 131. In other words, the voltage applied onto the third main sub-pixel electrode 133 is different from the voltage applied onto the third subsidiary sub-pixel electrode 134, so that the color shift occurred when the thin film transistor array substrate 10 is driving a liquid crystal layer can be improved. In another aspect, in this embodiment, in the three sub-pixels of one pixel 100, only in the third sub-pixel 130, the voltage applied onto the third subsidiary sub-pixel electrode 134 corresponding to the sixth area 132 is different from the voltage applied onto the third main sub-pixel electrode 133 corresponding to the fifth area 131, compared with the prior art, which can reduce the drawback of liquid crystal molecules in the liquid crystal layer being not fully/completely rotated, so that the loss of light passing through the liquid crystal layer can be reduced. Accordingly, compared with the prior art, the thin film transistor array substrate 10 in this embodiment when driving the liquid crystal layer can improve the large viewing angle color shift and increase the transmittance of light passing through the liquid crystal layer.

In this embodiment, the first sub-pixel 110 is a red sub-pixel, the second sub-pixel 120 is a green sub-pixel, and the third sub-pixel 130 is a blue sub-pixel. Since the human eye is most sensitive to a variation of the blue sub-pixel, less sensitive to a variation of the green sub-pixel and least sensitive to a variation of the red sub-pixel. Therefore, the voltage difference between the sub-pixel electrode in the sixth area 132 corresponding to the third sub-pixel 130 and the common electrode is set to be different from the voltage difference between the sub-pixel electrode in the fifth area 131 and the common electrode, which can greatly improve the large viewing angle color shift and minimize the loss of transmittance.

Figure 3:
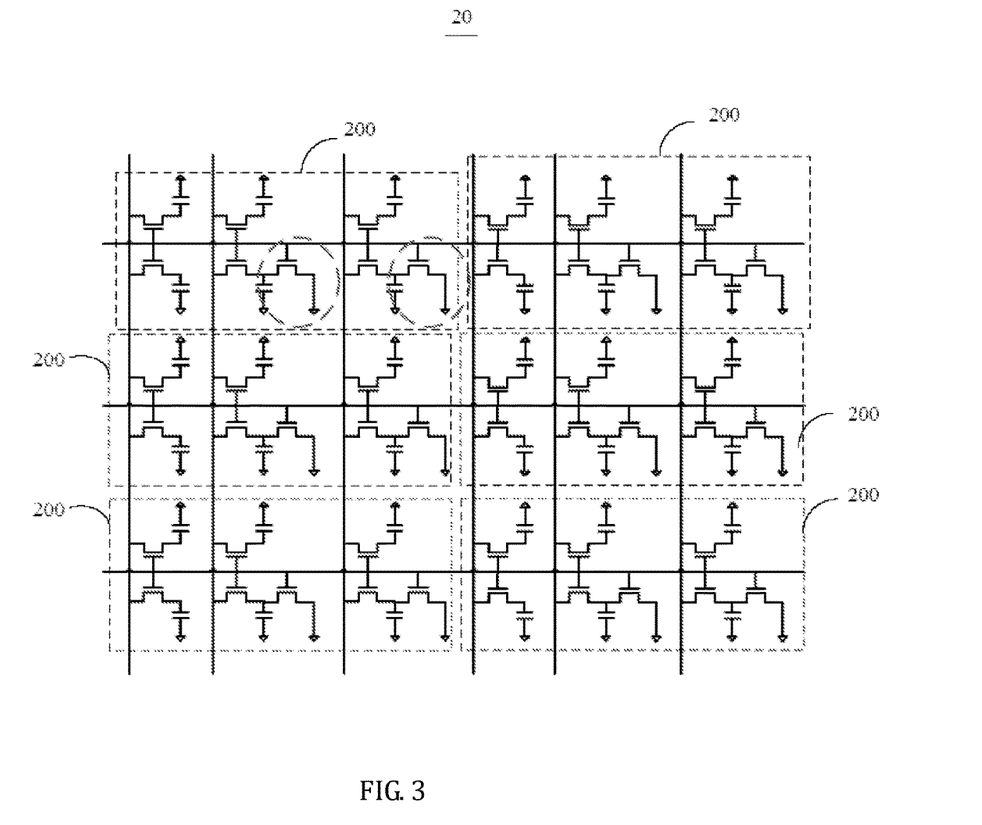
FIG. 3 is a schematic view of a thin film transistor array substrate according to a second preferred embodiment of the invention.
Figure 4:
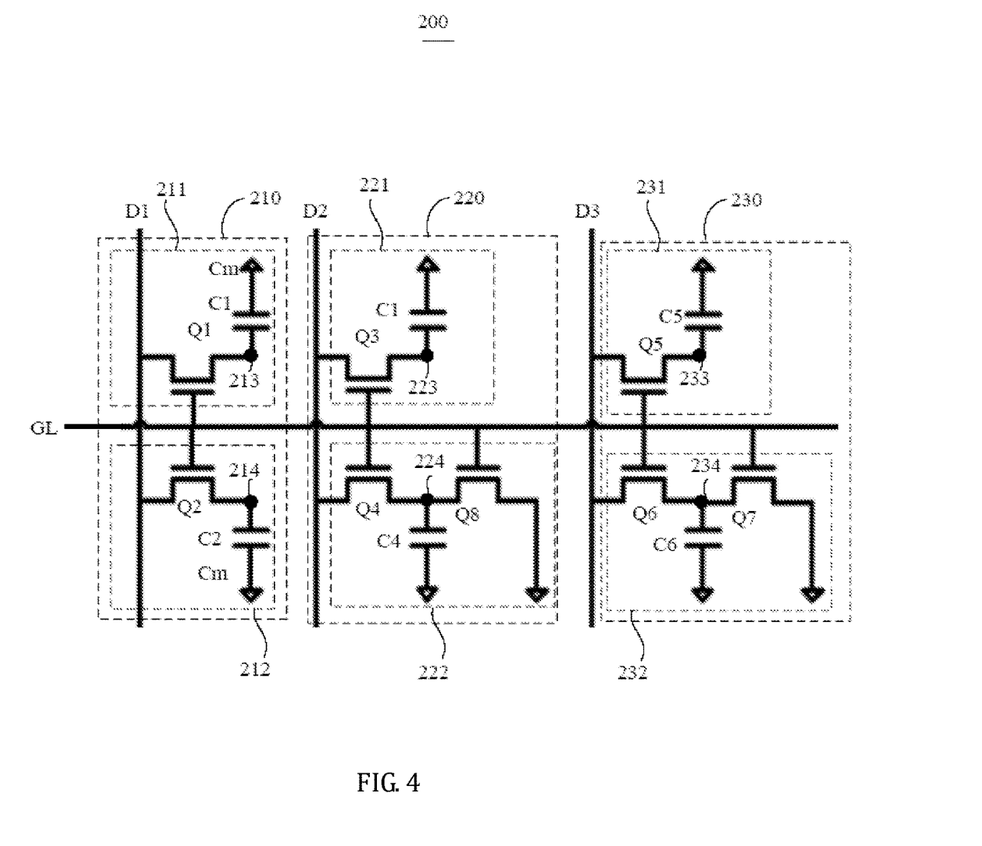
FIG. 4 is a structural schematic view of a pixel in the thin film transistor array substrate according to the second preferred embodiment of the invention.

Please refer to FIG. 3 and FIG. 4. FIG. 3 is a schematic view of a thin film transistor array substrate according to a second preferred embodiment of the invention, and FIG. 4 is a structural schematic view of a pixel in the thin film transistor array substrate according to the second preferred embodiment of the invention. In this embodiment, the thin film transistor array substrate 20 is disposed with a plurality of pixels 200 arranged in an array. Each pixel 200 includes a first sub-pixel 210, a second sub-pixel 220 and a third sub-pixel 230 arranged along a first direction. The first sub-pixel 210, the second sub-pixel 220 and the third sub-pixel 230 are connected to a same scan line GL. The thin film transistor array substrate 20 further is disposed with a first data line D1, a second data line D2 and a third data line D3 sequentially arranged along the first direction. The first data line D1 is configured for driving the first sub-pixel 210, the second data line D2 is configured for driving the second sub-pixel 220, and the third data line D3 is configured for driving the third sub-pixel 230. The first sub-pixel 210 includes a first area 211 and a second area 212 arranged along a second direction, the second sub-pixel 220 includes a third area 221 and a fourth area 222 arranged along the second direction, the third sub-pixel 230 includes a fifth area 231 and a sixth area 232 arranged along the second direction. A voltage difference between a sub-pixel electrode in the sixth area 232 and a common electrode is different from a voltage difference between a sub-pixel electrode in the fifth area 231 and the common electrode. In this embodiment, the first direction is the horizontal direction, and the second direction is the vertical direction.

The first area 211 has a first thin film transistor Q1 disposed therein, the second area 212 has a second thin film transistor Q2 disposed therein, the third area 221 has a third thin film transistor Q3 disposed therein, the fourth area 222 has a third thin film transistor Q4 and an eighth thin film transistor Q8 disposed therein, the fifth area 231 has a fifth thin film transistor Q5 disposed therein, the sixth area 232 has a sixth thin film transistor Q6 and a seventh thin film transistor Q7 disposed therein. The first thin film transistor Q1, the second thin film transistor Q2, the third thin film transistor Q3, the fourth thin film transistor Q4, the fifth thin film transistor Q5, the sixth thin film transistor Q6, the seventh thin film transistor Q7 and the eighth thin film transistor Q8 each include a gate, a source and a drain. The first area 211, the second area 212, the third area 221, the fourth area 222, the fifth area 231 and the sixth area 232 each are corresponding to one sub-pixel electrode, for the convenience of description, the corresponding sub-pixel electrode in the first area 211 is named as first main sub-pixel electrode 213, the corresponding sub-pixel electrode in the second area 212 is named as first subsidiary sub-pixel electrode 214, the corresponding sub-pixel electrode in the third area 221 is named as second main sub-pixel electrode 223, the corresponding sub-pixel electrode in the fourth area 222 is named as second subsidiary sub-pixel electrode 224, the corresponding sub-pixel electrode in the fifth area 231 is named as third main sub-pixel electrode 233, and the corresponding sub-pixel electrode in the sixth area 232 is named as third subsidiary sub-pixel electrode 234. It should be understood to those skilled in the art that, the names of the corresponding sub-pixel electrodes of the above various areas only are to distinguish the sub-pixels in different areas and for the convenience of description, and thus actually have no distinction of main and subsidiary.

The gates of the first thin film transistor Q1, the second thin film transistor Q2, the third thin film transistor Q3, the fourth thin film transistor Q4, the fifth thin film transistor Q5, the sixth thin film transistor Q6, the seventh thin film transistor Q7 and the eighth thin film transistor Q8 are connected to the same scan line GL. The drains of the first thin film transistor Q1 and the second thin film transistor Q2 are connected to the first data line D1, the source of the first thin film transistor Q1 sequentially connects the first main sub-pixel electrode 213 and a first capacitor C1 to the common electrode Cm (denoted by the triangle Δ in FIG. 4), the source of the second thin film transistor Q2 sequentially connects the first subsidiary sub-pixel electrode 214 and a second capacitor C2 to the common electrode Cm. The drains of the third thin film transistor Q3 and the fourth thin film transistor Q4 are connected to the second data line D2, the source of the third thin film transistor Q3 sequentially connects the second main sub-pixel electrode 223 and a third capacitor C3 to the common electrode Cm, the source of the fourth thin film transistor Q4 sequentially connects the second subsidiary sub-pixel electrode 224 and a fourth capacitor C4 to the common electrode Cm. The drain of the eighth thin film transistor Q8 is connected to the second subsidiary sub-pixel electrode 224, and the source of the eighth thin film transistor Q8 is connected to the common electrode Cm. The drains of the fifth thin film transistor Q5 and the sixth thin film transistor Q6 are connected to the third data line D3, the source of the fifth thin film transistor Q5 sequentially connects the third main sub-pixel electrode 233 and a fifth capacitor C5 to the common electrode Cm, the source of the sixth thin film transistor Q6 sequentially connects the third subsidiary sub-pixel electrode 234 and a sixth capacitor C6 to the common electrode Cm. The drain of the seventh thin film transistor Q7 is connected to the third subsidiary sub-pixel electrode 234, and the source of the seventh thin film transistor Q7 is connected to the common electrode Cm.

In this embodiment, since the drains of the fifth thin film transistor Q5 of the fifth area 231 and the sixth thin film transistor Q6 of the sixth area 232 both are connected to the third data line D3, the source of the fifth thin film transistor Q5 sequentially connects the third main sub-pixel electrode 233 and the fifth capacitor C5 to the common electrode Cm, the source of the sixth thin film transistor Q6 sequentially connects the third subsidiary sub-pixel electrode 234 and the sixth capacitor C6 to the common electrode Cm, the drain of the seventh thin film transistor Q7 is connected to the third subsidiary sub-pixel electrode 234, and the source of the seventh thin film transistor Q7 is connected to the common electrode Cm. That is, since the thin film transistor has a certain resistance, by the voltage-dividing effect of the seventh thin film transistor Q7, a voltage applied onto the third subsidiary sub-pixel electrode 234 in the sixth area 232 is different from a voltage applied onto the third main sub-pixel electrode 233 in the fifth area 231. In this embodiment, the voltage applied onto the third subsidiary sub-pixel electrode 234 in the sixth area 232 is smaller than the voltage applied onto the third main sub-pixel electrode 233 in the fifth area 231. Likewise, by the voltage-dividing effect of the eighth thin film transistor Q8, a voltage applied onto the second subsidiary sub-pixel electrode 224 in the fourth area 222 is different from a voltage applied onto the second main sub-pixel electrode 223 in the third area 221. In this embodiment, the voltage applied onto the second subsidiary sub-pixel electrode 224 in the fourth area 222 is smaller than the voltage applied onto the second main sub-pixel electrode 223 in the third area 221.

In this embodiment, a voltage difference between the sub-pixel electrode of the sixth area 232 and the common electrode is different from a voltage difference between the sub-pixel electrode of the fifth area 231 and the common electrode, and therefore, the voltage applied onto the sub-pixel electrode of the sixth area 232 is different from the voltage applied onto the sub-pixel electrode of the fifth area 231. In other words, the voltage applied onto the third main sub-pixel electrode 233 is different from the voltage applied onto the third subsidiary sub-pixel electrode 234, which can improve the color shift when the thin film transistor array substrate 20 is driving a liquid crystal layer. Likewise, in this embodiment, the voltage applied onto the second main sub-pixel electrode 223 is different from the voltage applied onto the second subsidiary sub-pixel electrode 224, which can further improve the color shift when the thin film transistor array substrate 20 is driving the liquid crystal layer. In another aspect, in this embodiment, in the third sub-pixel 230 of one pixel 200, the voltage applied onto the third subsidiary sub-pixel electrode 234 corresponding to the sixth area 232 is different from the voltage applied onto the third main sub-pixel electrode 233 corresponding to the fifth area 231; in the second sub-pixel 220, the voltage applied onto the second subsidiary sub-pixel electrode 224 corresponding to the fourth area 222 is different from the voltage applied onto the second main sub-pixel electrode 221 corresponding to the third area 221; compared with the prior art, this embodiment can reduce the drawback of liquid crystal molecules in the liquid crystal layer being not fully/completely rotated, so that the loss of light passing through the liquid crystal layer can be reduced. Accordingly, compared with the prior art, the thin film transistor array substrate 20 in this embodiment when driving the liquid crystal layer can improve the large viewing angle color shift and increase the transmittance of light passing through the liquid crystal layer.

Similarly, in this embodiment, the first sub-pixel 210 is a red sub-pixel, the second sub-pixel 220 is a green sub-pixel, and the third sub-pixel 230 is a blue sub-pixel.

Figure 5:
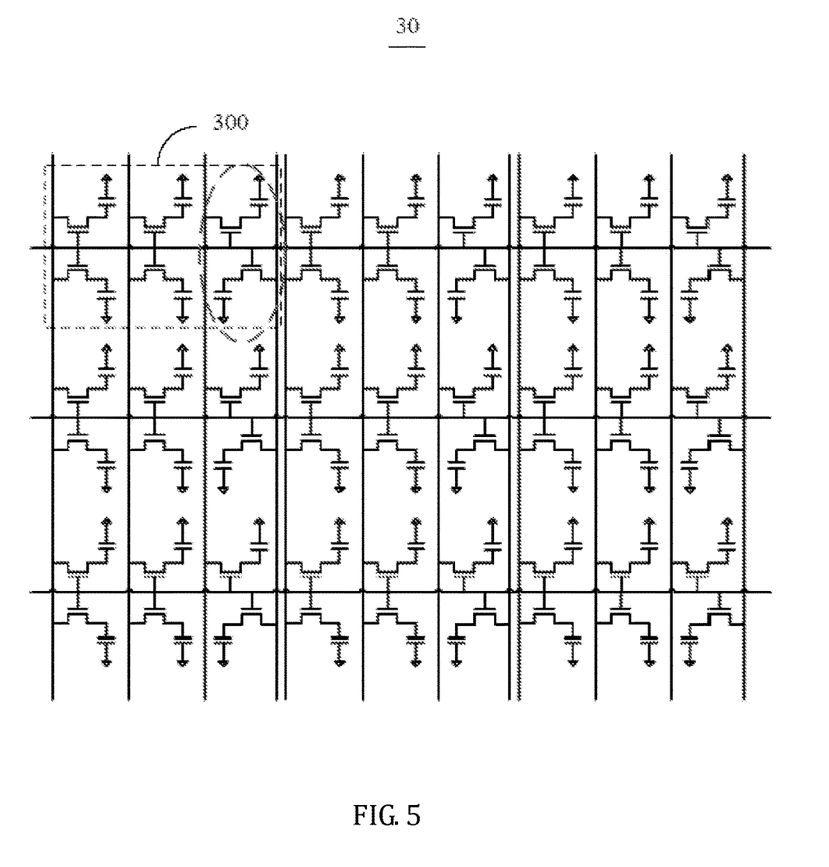
FIG. 5 is a schematic view of a thin film transistor array substrate according to a third preferred embodiment of the invention.
Figure 6:
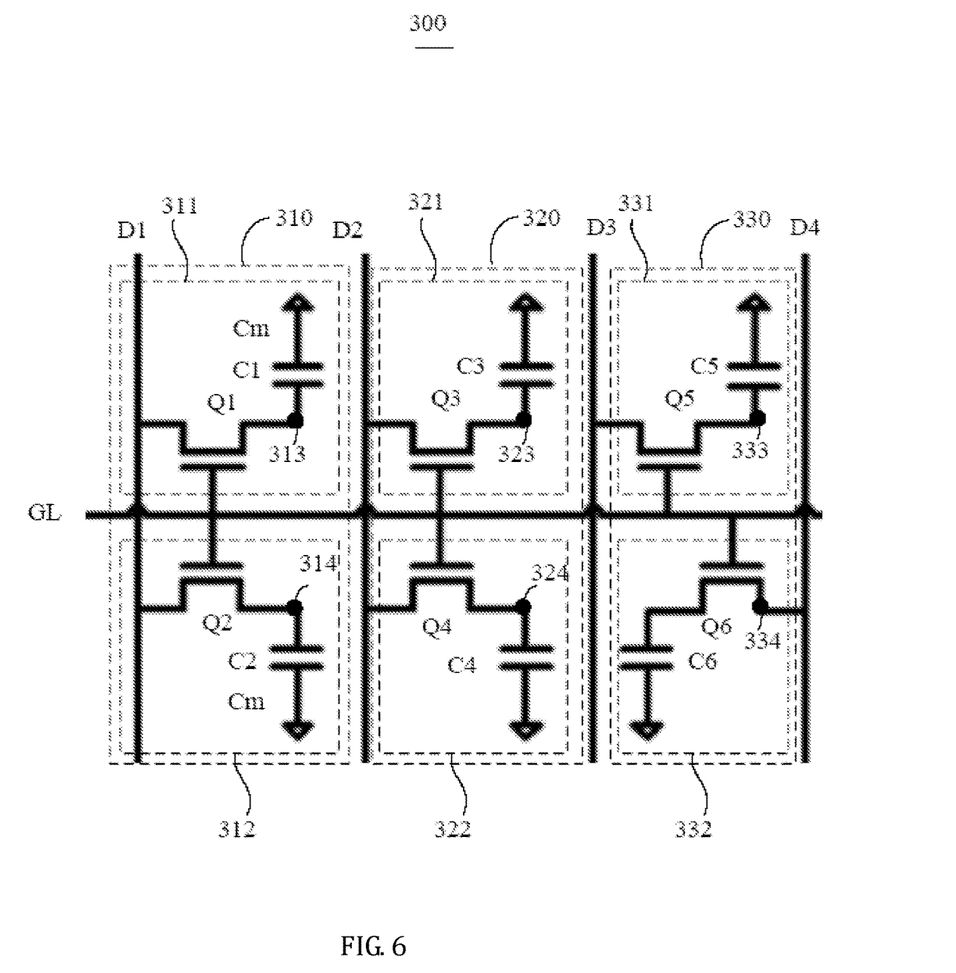
FIG. 6 is a structural schematic view of a pixel in the thin film transistor array substrate according to the third preferred embodiment of the invention.

Please refer to FIG. 5 and FIG. 6, FIG. 5 is a schematic view of a thin film transistor array substrate according to a third preferred embodiment of the invention, and FIG. 6 is a structural schematic view of a pixel in the thin film transistor array substrate according to the third preferred embodiment of the invention. The thin film transistor array substrate 30 is disposed with a plurality of pixels 300 arranged in an array. Each pixel 300 includes a first sub-pixel 310, the second sub-pixel 320 and a third sub-pixel 330 arranged along a first direction. The first sub-pixel 310, the second sub-pixel 320 and the third sub-pixel 330 are connected to a same scan line GL. The thin film transistor array substrate 30 further is disposed with a first data line D1, a second data line D2, a third data line D3 and a fourth data line D4 sequentially arranged along the first direction. The first data line D1 is configured for driving the first sub-pixel 310, the second data line D2 is configured for driving the second sub-pixel 320, the third data line D3 is configured for driving the third sub-pixel 330, and the fourth data line D4 is configured for driving the third sub-pixel 330. The first sub-pixel 310 includes a first area 311 and a second area 312 arranged along a second direction, the second sub-pixel 320 includes a third area 321 and a fourth area 322 arranged along the second direction, the third sub-pixel 330 includes a fifth area 331 and a sixth area 332 arranged along the second direction. A voltage difference between a sub-pixel electrode in the sixth area 332 and a common electrode is different from a voltage difference between a sub-pixel electrode in the fifth area 331 and the common electrode. In this embodiment, the first direction is the horizontal direction, and the second direction is the vertical direction. The third data line D3 is for driving the fifth area 331 of the third sub-pixel 330, the fourth data line D4 is for driving the sixth area 332 of the third sub-pixel 330, a driving voltage applied onto the third data line D3 is different from a driving voltage applied onto the fourth data line D4. In this embodiment, by using the third data line D3 and the fourth data line D4 to respectively drive the fifth area 331 and the sixth area 332 of the third sub-pixel 330, and the voltages applied onto the third data line D3 and the fourth data line D4 being different from each other, it is achieved that the voltage difference between the sub-pixel electrode in the sixth area 332 and the common electrode is different from the voltage difference between the sub-pixel electrode in the fifth area 331 and the common electrode.

The first area 311 has a first thin film transistor Q1 disposed therein, the second area 312 has a second thin film transistor Q2 disposed therein, the third area 321 has a third thin film transistor Q3 disposed therein, the fourth area 322 has a fourth thin film transistor Q4 disposed therein, the fifth area 331 has a fifth thin film transistor Q5 disposed therein and the sixth area 332 has a sixth thin film transistor Q6 disposed therein. The first thin film transistor Q1, the second thin film transistor Q2, the third thin film transistor Q3, the fourth thin film transistor Q4, the fifth thin film transistor Q5 and the sixth thin film transistor Q6 each include a gate, a source and a drain. The first area 311, the second area 312, the third area 321, the fourth area 322, the fifth area 331 and the sixth area 332 each are corresponding to one sub-pixel electrode, for the convenience of description, the corresponding sub-pixel electrode in the first area 311 is named as first main sub-pixel electrode 313, the corresponding sub-pixel electrode in the second area 312 is named as first subsidiary sub-pixel electrode 314, the corresponding sub-pixel electrode in the third area 321 is named as second main sub-pixel electrode 323, the corresponding sub-pixel electrode in the fourth area 322 is named as second subsidiary sub-pixel electrode 324, the corresponding sub-pixel electrode in the fifth area 331 is named as third main sub-pixel electrode 333, and the corresponding sub-pixel electrode in the sixth area 332 is named as third subsidiary sub-pixel electrode 334. It should be understood to those skilled in the art that, the names of the corresponding sub-pixel electrodes of the above various areas only are to distinguish the sub-pixels in different areas and for the convenience of description, and thus actually have no distinction of main and subsidiary.

The gates of the first thin film transistor Q1, the second thin film transistor Q2, the third thin film transistor Q3, the fourth thin film transistor Q4, the fifth thin film transistor Q5 and the sixth thin film transistor Q6 are connected to the same scan line GL. The drains of the first thin film transistor Q1 and the second thin film transistor Q2 are connected to the first data line D1, the source of the first thin film transistor Q1 sequentially connects the first main sub-pixel electrode 313 and a first capacitor C1 to the common electrode Cm (denoted by the triangle Δ in FIG. 6), the source of the second thin film transistor Q2 sequentially connects the first subsidiary sub-pixel electrode 314 and a second capacitor C2 to the common electrode Cm. The drains of the third thin film transistor Q3 and the fourth thin film transistor Q4 are connected to the second data line D2, the source of the third thin film transistor Q3 sequentially connects the second main sub-pixel electrode 323 and a third capacitor C3 to the common electrode Cm, the source of the fourth thin film transistor Q4 sequentially connects the second subsidiary sub-pixel electrode 324 and a fourth capacitor C4 to the common electrode Cm. The drain of the fifth thin film transistor Q5 is connected to the third data line D3, the source of the fifth thin film transistor Q5 sequentially connects the third main sub-pixel electrode 333 and a fifth capacitor C5 to the common electrode Cm. The drain of the sixth thin film transistor Q6 is connected to the fourth data line D4, the source of the sixth thin film transistor Q6 sequentially connects the third subsidiary sub-pixel electrode 334 and a sixth capacitor C6 to the common electrode Cm.

In this embodiment, by using the third data line D3 and the fourth data line D4 to respectively drive the fifth area 331 and the sixth area 332 of the third sub-pixel 330, and the voltages applied onto the third data line D3 and the fourth data line D4 being different from each other, it is achieved that the voltage difference between the sub-pixel electrode in the sixth area 332 and the common electrode is different from the voltage difference between the sub-pixel electrode in the fifth area 331 and the common electrode. In other words, the voltage applied onto the third main sub-pixel electrode 333 is different from the voltage applied onto the third subsidiary sub-pixel electrode 334, which can improve the color shift when the thin film transistor array substrate 30 is driving a liquid crystal layer. In another aspect, in this embodiment, in the three sub-pixels of one pixel 300, only in the third sub-pixel 330, the voltage applied onto the third subsidiary sub-pixel electrode 334 corresponding to the sixth area 332 is different from the voltage applied onto the third main sub-pixel electrode 333 corresponding to the fifth area 331, compared with the prior art, this embodiment can reduce the drawback of liquid crystal molecules in the liquid crystal layer being not fully/completely rotated, so that the loss of light passing through the liquid crystal layer can be reduced. Accordingly, compared with the prior art, the thin film transistor array substrate 30 in this embodiment during the driving the liquid crystal layer can improve the large viewing angle color shift and increase the transmittance of light passing through the liquid crystal layer.

In this embodiment, the first sub-pixel 310 is a red sub-pixel, the second sub-pixel 320 is a green sub-pixel, and the third sub-pixel 330 is a blue sub-pixel.

Figure 7:
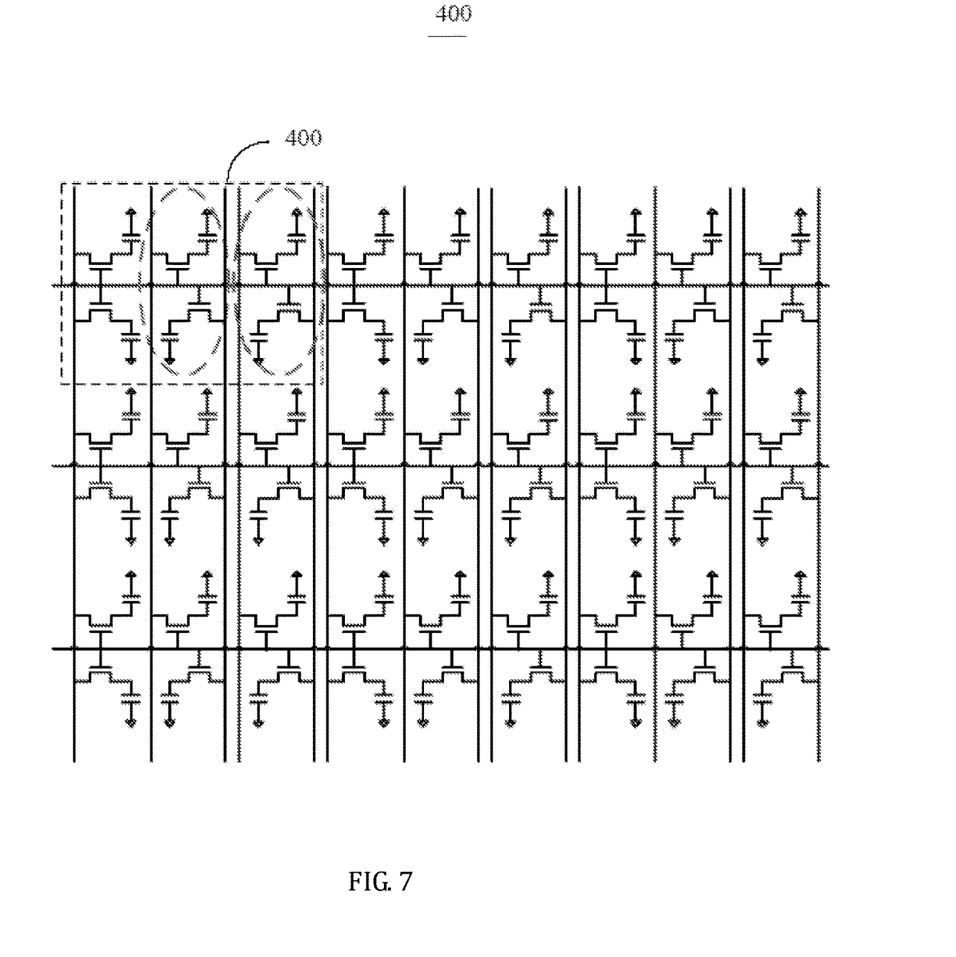
FIG. 7 is a schematic view of a thin film transistor array substrate according to a fourth preferred embodiment of the invention.
Figure 8:
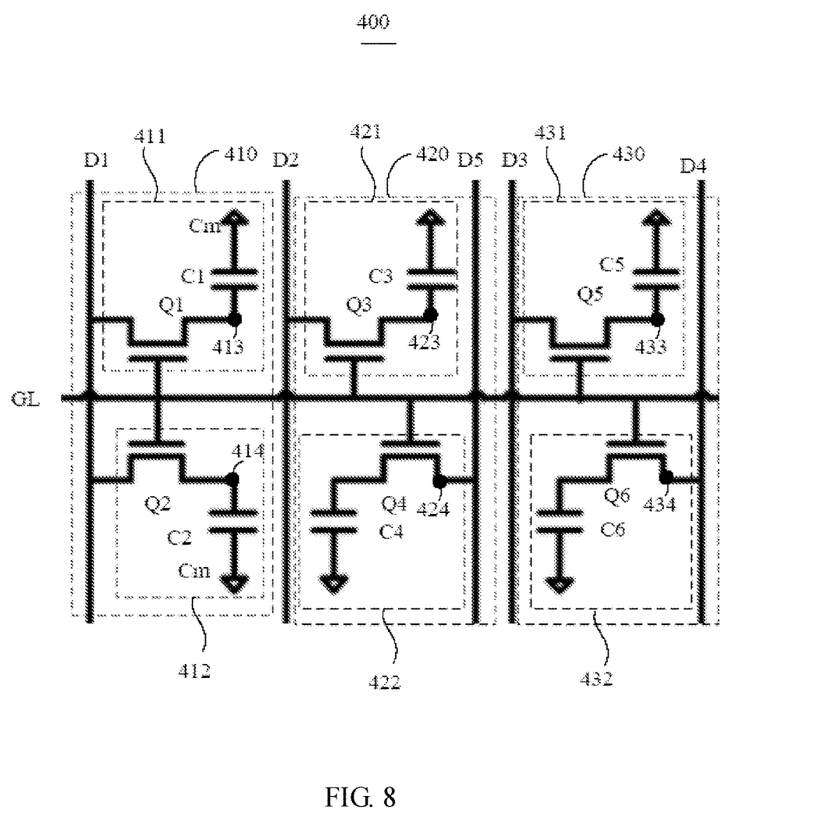
FIG. 8 is a structural schematic view of a pixel in the thin film transistor array substrate according to the fourth preferred embodiment of the invention.

Please refer to FIG. 7 and FIG. 8, FIG. 7 is a schematic view of a thin film transistor array substrate according to a fourth preferred embodiment of the invention, and FIG. 8 is a structural schematic view of a pixel in the thin film transistor array substrate according to the fourth preferred embodiment of the invention. The thin film transistor array substrate 40 is disposed with a plurality of pixels 400 arranged in an array. Each pixel 400 includes a first sub-pixel 410, a second sub-pixel 420 and a third sub-pixel 430 arranged along a first direction. The first sub-pixel 410, the second sub-pixel 420 and the third sub-pixel 430 are connected to a same scan line GL. The thin film transistor array substrate 40 further is disposed with a first data line D1, a second data line D2, a fifth data line D5, a third data line D3 and a fourth data line D4 sequentially arranged along the first direction. The first data line D1 is configured for driving the first sub-pixel 410, the second data line D2 is configured for driving the second sub-pixel 420, the third data line D3 is configured for driving the third sub-pixel 430, the fourth data line D4 is configured for driving the third sub-pixel 430, and the fifth data line D5 is configured for driving the second sub-pixel 420. The first sub-pixel 410 includes a first area 411 and a second area 412 arranged along a second direction, the second sub-pixel 420 includes a third area 421 and a fourth area 422 arranged along the second direction, the third sub-pixel 430 includes a fifth area 431 and a sixth area 432 arranged along the second direction. A voltage difference between a sub-pixel electrode in the sixth area 432 and a common electrode is different from a voltage difference between a sub-pixel electrode in the fifth area 431 and the common electrode. In this embodiment, the first direction is the horizontal direction, and the second direction is the vertical direction. The third data line D3 is for driving the fifth area 431 of the third sub-pixel 430, the fourth data line D4 is for driving the sixth area 432 of the third sub-pixel 430, a driving voltage applied onto the third data line D3 is different from a driving voltage applied onto the fourth data line D4. The second data line D2 is for driving the third area 421 of the second sub-pixel 420, the fifth data line D5 is for driving the fourth area 422 of the second sub-pixel 420, a driving voltage applied onto the second data line D2 is different from a driving voltage applied onto the fifth data line D5. In this embodiment, by making the driving voltage applied onto the third data line D3 be different from the driving voltage applied onto the fourth data line D4, it is achieved that the voltage applied onto the sub-pixel electrode in the fifth area 431 is different from the voltage applied onto the sub-pixel electrode in the sixth area 432. By making the driving voltage applied onto the second data line D2 be different from the driving voltage applied onto the fifth data line D5, it is achieved that the voltage applied onto the sub-pixel electrode in the third area 421 is different from the voltage applied onto the sub-pixel electrode in the fourth area 422.

The first area 411 has a first thin film transistor Q1 disposed therein, the second area 412 has a second thin film transistor Q2 disposed therein, the third area 421 has a third thin film transistor Q3 disposed therein, the fourth area 422 has a fourth thin film transistor Q4 disposed therein, the fifth area 431 has a fifth thin film transistor Q5 disposed therein, and the sixth area 432 has a sixth thin film transistor Q6 disposed therein. The first thin film transistor Q1, the second thin film transistor Q2, the third thin film transistor Q3, the fourth thin film transistor Q4, the fifth thin film transistor Q5 and the sixth thin film transistor Q6 each include a gate, a source and a drain. The first area 411, the second area 412, the third area 421, the fourth area 422, the fifth area 431 and the sixth area 432 each are corresponding to one sub-pixel electrode, for the convenience of description, the corresponding sub-pixel electrode in the first area 411 is named as first main sub-pixel electrode 413, the corresponding sub-pixel electrode in the second area 412 is named as first subsidiary sub-pixel electrode 414, the corresponding sub-pixel electrode in the third area 421 is named as second main sub-pixel electrode 423, the corresponding sub-pixel electrode in the fourth area 422 is named as second subsidiary sub-pixel electrode 424, the corresponding sub-pixel electrode in the fifth area 431 is named as third main sub-pixel electrode 433, and the corresponding sub-pixel electrode in the sixth area 432 is named as third subsidiary sub-pixel electrode 434. It should be understood to those skilled in the art that, the names of the corresponding sub-pixel electrodes of the above various areas only are to distinguish the sub-pixels in different areas and for the convenience of description, and thus actually have no distinction of main and subsidiary.

The gates of the first thin film transistor Q1, the second thin film transistor Q2, the third thin film transistor Q3, the fourth thin film transistor Q4, the fifth thin film transistor Q5 and the sixth thin film transistor Q6 are connected to the same scan line GL. The drains of the first thin film transistor Q1 and the second thin film transistor Q2 are connected to the first data line D1, the source of the first thin film transistor Q1 sequentially connects the first main sub-pixel electrode 413 and a capacitor C1 to the common electrode Cm (denoted by the triangle Δ in FIG. 8), the source of the second thin film transistor Q2 sequentially connects the first subsidiary sub-pixel electrode 414 and a second capacitor C2 to the common electrode Cm. The drain of the third thin film transistor Q3 is connected to the second data line D2, the source of the third thin film transistor Q3 sequentially connects the second main sub-pixel electrode 423 and a third capacitor C3 to the common electrode Cm, the drain of the fourth thin film transistor Q4 is connected to the fifth data line D5, the source of the fourth thin film transistor Q4 sequentially connects the second subsidiary sub-pixel electrode 424 and a fourth capacitor C4 to the common electrode Cm. The drain of the fifth thin film transistor Q5 is connected the third data line D3, the source of the fifth thin film transistor Q5 sequentially connects the third main sub-pixel electrode 433 and a fifth capacitor C5 to the common electrode Cm. The drain of the sixth thin film transistor Q6 is connected to the fourth data line D4, the source of the sixth thin film transistor Q6 sequentially connects the third subsidiary sub-pixel electrode 434 and a sixth capacitor C6 to the common electrode Cm.

In this embodiment, by using the third data line D3 and the fourth data line D4 to respectively drive the fifth area 431 and the sixth area 432 of the third sub-pixel 430, the voltages applied onto the third data line D3 and the fourth data line D4 being different from each other, it is achieved that a voltage difference between the sub-pixel electrode in the sixth area 432 and the common electrode is different from a voltage difference between the sub-pixel electrode in the fifth area 431 and the common electrode. In other words, the voltage applied onto the third main sub-pixel electrode 433 is different from the voltage applied onto the third subsidiary sub-pixel electrode 434, which can improve the color shift when the thin film transistor array substrate 40 driving a liquid crystal layer. Likewise, by using the second data line D2 and the fifth data line D5 to respectively drive the third area 421 and the fourth area 422 of the second sub-pixel 420, voltages applied onto the second data line D2 and the fifth data line D5 being different from each other, it is achieved that a voltage difference between the sub-pixel electrode in the third area 421 and the common electrode is different from a voltage difference between the sub-pixel electrode in the fourth area 422 and the common electrode. Compared with the prior art, this embodiment can reduce the drawback of liquid crystal molecules in the liquid crystal layer being not fully/completely rotated, so that the loss of light passing through the liquid crystal layer is reduced. Accordingly, compared with the prior art, the thin film transistor array substrate in this embodiment during driving the liquid crystal layer can improve the large viewing angle color shift and increase the transmittance of light passing through the liquid crystal layer.

In this embodiment, the first sub-pixel 410 is a red sub-pixel, the second sub-pixel 420 is a green sub-pixel, and the third sub-pixel 430 is a blue sub-pixel.

The invention further includes a display panel, in various preferred embodiments of the display panel, the display panel includes any one of the thin film transistor array substrates associated with FIGS. 1 through 8 and thus will be not repeated herein.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A thin film transistor array substrate, comprising a plurality of pixels arranged in an array,
wherein each of the plurality of pixels comprises a first sub-pixel, a second sub-pixel and a third sub-pixel sequentially arranged in a first direction, the first sub-pixel, the second sub-pixel and the third sub-pixel being connected to a same scan line;
the thin film transistor array substrate further comprises a first data line, a second data line and a third data line sequentially arranged in the first direction, the first data line being configured for driving the first sub-pixel, the second data line being configured for driving the second sub-pixel, the third data line being configured for driving the third sub-pixel; and
the first sub-pixel comprises a first area and a second area arranged in a second direction; the second sub-pixel comprises a third area and a fourth area arranged in the second direction; the third sub-pixel comprises a fifth area and a sixth area arranged in the second direction;
wherein a voltage difference between a sub-pixel electrode in the sixth area and a common electrode is different from a voltage difference between a sub-pixel electrode in the fifth area and the common electrode;
wherein the thin film transistor array substrate further comprises a fourth data line, the third data line being configured for driving the fifth area of the third sub-pixel, the fourth data line being configured for the sixth area of the third sub-pixel, wherein a driving voltage applied onto the third data line is different from a driving voltage applied onto the fourth data line; and
wherein the first area comprises a first thin film transistor disposed therein; the second area comprises a second thin film transistor disposed therein; the third area comprises a third thin film transistor disposed therein; the fourth area comprises a fourth thin film transistor disposed therein; the fifth area comprises a fifth thin film transistor disposed therein; and the sixth area has a sixth thin film transistor disposed therein, wherein gates of the first thin film transistor, the second thin film transistor, the third thin film transistor, the fourth thin film transistor, the fifth thin film transistor, and the sixth thin film transistor are connected to the same scan line; drains of the first thin film transistor and the second thin film transistor are connected to the first data line; a source of the first thin film transistor sequentially connects a first main sub-pixel electrode and a first capacitor to the common electrode; a source of the second thin film transistor sequentially connects a first subsidiary sub-pixel electrode and a second capacitor to the common electrode; drains of the third thin film transistor and the fourth thin film transistor are connected to the second data line; a source of the third thin film transistor sequentially connects a second main sub-pixel electrode and a third capacitor to the common electrode; a source of the fourth thin film transistor sequentially connects a second subsidiary sub-pixel electrode and a fourth capacitor to the common electrode; a drain of the fifth thin film transistor is connected to the third data line; a source of the fifth thin film transistor sequentially connects a third main sub-pixel electrode and a fifth capacitor to the common electrode; a drain of the sixth thin film transistor is connected to the fourth data line; a source of the sixth thin film transistor sequentially connects a third subsidiary sub-pixel electrode and a sixth capacitor to the common electrode.

2. The thin film transistor array substrate as claimed in claim 1, wherein the first sub-pixel is a red sub-pixel, the second sub-pixel is a green sub-pixel, and the third sub-pixel is a blue sub-pixel.

3. The thin film transistor array substrate as claimed in claim 1, wherein a voltage difference between a sub-pixel electrode in the fourth area and the common electrode is different from a voltage difference between a sub-pixel electrode in the third area and the common electrode.

4. The thin film transistor array substrate as claimed in claim 3, wherein the four area has an additional thin film transistor disposed therein; a gate of the additional thin film transistor is connected to the scan line; a drain of the additional thin film transistor is connected to a second subsidiary sub-pixel electrode; and a source of the additional thin film transistor is connected to the common electrode.

5. A thin film transistor array substrate, comprising a plurality of pixels arranged in an array,
wherein each of the plurality of pixels comprises a first sub-pixel, a second sub-pixel and a third sub-pixel sequentially arranged in a first direction, the first sub-pixel, the second sub-pixel and the third sub-pixel being connected to a same scan line;
the thin film transistor array substrate further comprises a first data line, a second data line and a third data line sequentially arranged in the first direction, the first data line being configured for driving the first sub-pixel, the second data line being configured for driving the second sub-pixel, the third data line being configured for driving the third sub-pixel; and
the first sub-pixel comprises a first area and a second area arranged in a second direction; the second sub-pixel comprises a third area and a fourth area arranged in the second direction; the third sub-pixel comprises a fifth area and a sixth area arranged in the second direction;
wherein a voltage difference between a sub-pixel electrode in the sixth area and a common electrode is different from a voltage difference between a sub-pixel electrode in the fifth area and the common electrode;
wherein the thin film transistor array substrate further comprises a fourth data line, the third data line being configured for driving the fifth area of the third sub-pixel, the fourth data line being configured for the sixth area of the third sub-pixel, wherein a driving voltage applied onto the third data line is different from a driving voltage applied onto the fourth data line;
wherein the thin film transistor array substrate further comprises a fifth data line, the second data line being configured for driving the third area of the second sub-pixel, the fifth data line being configured for driving the fourth area of the second sub-pixel, wherein a driving voltage applied onto the second data line is different from a driving voltage applied onto the fifth data line.

6. The thin film transistor array substrate as claimed in claim 5, wherein the first area comprises a first thin film transistor disposed therein; the second area comprises a second thin film transistor disposed therein; the third area has a third thin film transistor disposed therein, the fourth area has a fourth thin film transistor disposed therein, the fifth area has a fifth thin film transistor disposed therein, and the sixth area has a sixth thin film transistor disposed therein; gates of the first thin film transistor, the second thin film transistor, the third thin film transistor, the fourth thin film transistor, the fifth thin film transistor and the sixth thin film transistor are connected to the same scan line, drains of the first thin film transistor and the second thin film transistor are connected to the first data line, a source of the first thin film transistor sequentially connects a first main sub-pixel electrode and a first capacitor to the common electrode, a source of the second thin film transistor sequentially connects a first subsidiary sub-pixel electrode and a second capacitor to the common electrode; a source of the third thin film transistor sequentially connects a second main sub-pixel electrode and a third capacitor to the common electrode, a drain of the third thin film transistor is connected to the second data line, a source of the fourth thin film transistor sequentially connects a second subsidiary sub-pixel electrode and a fourth capacitor to the common electrode, a drain of the fourth thin film transistor is connected to the fifth data line; a drain of the fifth thin film transistor is connected to the third data line, a source of the fifth thin film transistor sequentially connects a third main sub-pixel electrode and a fifth capacitor to the common electrode, a drain of the sixth thin film transistor is connected to the fourth data line, and a source of the sixth thin film transistor sequentially connects a third subsidiary sub-pixel electrode and a sixth capacitor to the common electrode.

7. The thin film transistor array substrate as claimed in claim 5, wherein the first sub-pixel is a red sub-pixel, the second sub-pixel is a green sub-pixel, and the third sub-pixel is a blue sub-pixel.

8. A display panel comprising a thin film transistor array substrate having a plurality of pixels arranged in an array,
wherein each of the plurality of pixels comprises a first sub-pixel, a second sub-pixel and a third sub-pixel sequentially arranged in a first direction, the first sub-pixel, the second sub-pixel and the third sub-pixel being connected to a same scan line;
the thin film transistor array substrate further comprises a first data line, a second data line and a third data line sequentially arranged in the first direction, the first data line being configured for driving the first sub-pixel, the second data line being configured for driving the second sub-pixel, the third data line being configured for driving the third sub-pixel; and
the first sub-pixel comprises a first area and a second area arranged in a second direction; the second sub-pixel comprises a third area and a fourth area arranged in the second direction; and the third sub-pixel comprises a fifth area and a sixth area arranged in the second direction; and
wherein a voltage difference between a sub-pixel electrode in the sixth area and a common electrode is different from a voltage difference between a sub-pixel electrode in the fifth area and the common electrode;
wherein the thin film transistor array substrate further comprises a fourth data line, the third data line being configured for driving the fifth area of the third sub-pixel, the fourth data line being configured for the sixth area of the third sub-pixel, wherein a driving voltage applied onto the third data line is different from a driving voltage applied onto the fourth data line;
wherein the thin film transistor array substrate further comprises a fifth data line, the second data line being configured for driving the third area of the second sub-pixel, the fifth data line being configured for driving the fourth area of the second sub-pixel, wherein a driving voltage applied onto the second data line is different from a driving voltage applied onto the fifth data line.

9. The display panel as claimed in claim 8, wherein the first area comprises a first thin film transistor disposed therein; the second area comprises a second thin film transistor disposed therein; the third area has a third thin film transistor disposed therein, the fourth area has a fourth thin film transistor disposed therein, the fifth area has a fifth thin film transistor disposed therein, and the sixth area has a sixth thin film transistor disposed therein; gates of the first thin film transistor, the second thin film transistor, the third thin film transistor, the fourth thin film transistor, the fifth thin film transistor and the sixth thin film transistor are connected to the same scan line, drains of the first thin film transistor and the second thin film transistor are connected to the first data line, a source of the first thin film transistor sequentially connects a first main sub-pixel electrode and a first capacitor to the common electrode, a source of the second thin film transistor sequentially connects a first subsidiary sub-pixel electrode and a second capacitor to the common electrode; a source of the third thin film transistor sequentially connects a second main sub-pixel electrode and a third capacitor to the common electrode, a drain of the third thin film transistor is connected to the second data line, a source of the fourth thin film transistor sequentially connects a second subsidiary sub-pixel electrode and a fourth capacitor to the common electrode, a drain of the fourth thin film transistor is connected to the fifth data line; a drain of the fifth thin film transistor is connected to the third data line, a source of the fifth thin film transistor sequentially connects a third main sub-pixel electrode and a fifth capacitor to the common electrode, a drain of the sixth thin film transistor is connected to the fourth data line, and a source of the sixth thin film transistor sequentially connects a third subsidiary sub-pixel electrode and a sixth capacitor to the common electrode.

10. The display panel as claimed in claim 8, wherein the first sub-pixel is a red sub-pixel, the second sub-pixel is a green sub-pixel, and the third sub-pixel is a blue sub-pixel.

* * * * *